United States Patent
Suzuki et al.

(10) Patent No.: US 7,270,017 B2
(45) Date of Patent: Sep. 18, 2007

(54) TORQUE MEASURING DEVICE FOR ROTATING BODY

(75) Inventors: Shinya Suzuki, Shizuoka-ken (JP); Shigeyuki Adachi, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 11/128,819

(22) Filed: May 13, 2005

(65) Prior Publication Data

US 2005/0257626 A1  Nov. 24, 2005

(30) Foreign Application Priority Data

May 24, 2004  (JP)  .............................. 2004-152769

(51) Int. Cl.
    *E21B 7/04*  (2006.01)
(52) U.S. Cl. ............................ 73/862.331; 73/862.321; 73/862.324; 73/862.193
(58) Field of Classification Search ............ 73/862.193, 73/862.321, 862.324, 862.331
    See application file for complete search history.

(56) References Cited

U.S. PATENT DOCUMENTS 2,762,971 A * 9/1956 Parker ...................... 324/650
5,706,184 A 1/1998 Mizuta et al.
6,472,656 B2 * 10/2002 Arai ....................... 250/231.14

FOREIGN PATENT DOCUMENTS

| EP | 1 170 577 A2 | 1/2002 |
| EP | 1 170 577 A3 | 1/2002 |
| JP | 2002-022566 | 1/2002 |

* cited by examiner

*Primary Examiner*—Edward Lefkowitz
*Assistant Examiner*—Freddie Kirkland, III
(74) *Attorney, Agent, or Firm*—McDermott Will & Emery LLP

(57) ABSTRACT

A torque measuring device for a rotating body is provided, which includes: a stationary section; a rotary section; a rotary transformer composed of a primary coil disposed at the stationary section, and a secondary coil disposed at the rotary section, wherein an electric power is transmitted from the stationary section to the rotary section by electromagnetic induction, a torque generated at a rotating body is detected at the rotary section by means of the electric power transmitted, and wherein a detection result is transmitted from the rotary section to the stationary section. In the torque measuring device, a capacitor is connected at the side of the secondary coil of the rotary transformer, and a series resonant circuit is formed by the capacitor in combination with a leakage inductance of the rotary transformer.

2 Claims, 5 Drawing Sheets ic device for a rotating body to measure a torque of a rotating body,
TORQUE MEASURING DEVICE FOR ROTATING BODY This application claims priority from Japanese Application No. 2004-152769, filed May 24, 2004 (incorporated by reference herein).

BACKGROUND OF THE INVENTION

1. Field of the Invention

The present invention relates to a torque measuring device for a rotating body to measure a torque of a rotating body, and more particularly to a torque measuring device for a rotating body, in which a torque amount of a rotating body is detected at a rotary section as an electricity amount that is then transmitted from the rotary section to a stationary section in a non-contact manner.

2. Description of the Related Art

Conventionally, a torque of a rotating body is measured by a device, in which an amount of torsion generated at a hollow circular cylindrical member constituting a rotary section, disposed between a driving shaft rotating and a driven shaft loaded, and fixedly jointed to both the shafts is detected as an electricity amount by strain gauges adhesively attached to the hollow circular cylindrical member, and the electricity amount detected is transmitted to a stationary section for performing torque measurement.

A device for measuring a torque of a rotating body is proposed, in which an electric signal is converted into an optical signal for transmission from a rotary section to a stationary section. Such a device is structured as shown in FIG. 1 (refer to Japanese Patent Application Laid-Open No. 2002-22566).

FIG. 1 is a front view of a conventional torque measuring device for a rotating body disclosed in the aforementioned Japanese Patent Application Laid-Open No. 2002-22566, and FIG. 2 is a side view (partly sectioned) of FIG. 1.

Referring to FIG. 2, the torque measuring device for a rotating body includes a rotary section which is composed of a driving side flange 101 fixedly jointed to a rotating body, a driven side flange 102, and a hollow circular cylinder 100 blinded at one end, defining predetermined outer and inner diameters thus a predetermined wall thickness, and having the flanges 101 and 102 integrally formed respectively on both end portions thereof.

The driving side flange 101 has its outer side jointed to a joint member at a driving side in a drive train by a screw engaging into a screw hole 103, while the driven side flange 102 has its outer side jointed to a load object by a screw engaging into a screw hole 104.

A plurality of strain gauges 106 are adhesively attached to the inner circumference of the hollow circular cylinder 100 in a line along a portion 105 having the smallest radial thickness, and s physical quantity corresponding to a torque acting on the hollow circular cylinder 100 is converted into an electrical signal by a sensor using the strain gauges 106.

The driven side flange 102 has, toward its outer circumference, a rotary transformer 111 which is formed by a primary coil 116 (see FIG. 3), and a secondary coil 117 (see FIG. 3) disposed so as to oppose the primary coil 116. A magnetic core 112 at the rotary section is for the primary coil 116 of the rotary transformer 111 and has a groove in which light emitting diodes (LED's) 113 as electrical-optical converting elements are disposed, and a magnetic core 114 at the stationary section is for the secondary coil 117 of the rotary transformer 111.

The electrical signal generated by the aforementioned sensor using the strain gauges 106 is converted into an optical signal by the LED's 113, and the optical signal outputted from the LED's 113 is received at the circumferential surface of an optical fiber 115 disposed at the stationary section thus signal transmission from the rotary section to the stationary section is performed.

The optical signal received at the circumferential surface of the optical fiber 115 progresses therethrough, exits out from the end surface thereof, and is received and converted into an electrical signal by an optical-electrical converting element, and a torque amount is calculated based on the electrical signal.

In such a torque measuring device for a rotating body, a circuit board 109 for mounting an electronic circuit is provided inside the hollow circular cylinder 100 at a blind end 108 thereof in order to reduce negative effects of wind force and centrifugal force due to a high-speed rotation on the strain gauges 106, and a lid 110 is provided at an open end 107 of the hollow circular cylinder 100 in order to prevent the strain gauges 106 from deteriorating by moisture and dusts coming from outside.

FIG. 3 is a block diagram showing respective circuitries for the rotary section and the stationary section in the conventional torque measuring device for a rotating body.

A DC voltage from a DC power supply 611 is converted into an AC voltage of a frequency of about 15 kHz by an oscillation circuit 612, and the AC voltage is amplified by an amplification circuit 613 and applied to the primary coil 116 of the rotary transformer 111 at the rotary section.

Then, an AC voltage is induced at the secondary coil 117 of the rotary transformer 111 at the stationary section, and converted into a DC voltage by a rectifying and smoothing circuit 615, the DC voltage has its fluctuation reduced by a stabilized power supply circuit 616, and a necessary voltage is supplied from a strain gauge power supply circuit 617 to a Wheatstone bridge circuit 618 formed by the strain gauges 106.

An output from the Wheatstone bridge circuit 618 is amplified by an amplifier 619, has its excess frequency components removed by a filter circuit 620, and is converted into a frequency-modulated signal by a voltage-frequency converter (V/F converter) 621.

The signal outputted from the voltage-frequency converter 621 is inputted to an electrical-optical converting element 113, and an optical signal outputted from the electrical-optical converting element 113 is received by the optical fiber 115 disposed at the stationary section and is converted into an electrical signal by a photodiode 131.

The electrical signal from the photodiode 131 is amplified by an AGC circuit 625, and the amplified signal goes via a waveform shaping circuit 626, has its frequency change converted into voltage change by a frequency-voltage converter (F/V converter) 627, and has its noise components removed by a low-pass filter circuit 628.

A signal outputted from the low-pass filter 628 is inputted to an output buffer circuit 629, and a torque measurement value is outputted from an output terminal OS.

In the conventional torque measuring device for a rotating body described above, an amount of torsion generated at the hollow circular cylinder 100 is converted into an electrical signal by the strain gauges 106 attached to the hollow circular cylinder 100, and the electrical signal is converted into an optical signal by the LED's 113 for transmission from the rotary section to the stationary section, where the hollow circular cylinder 100 is required not only to have distortion generated therein as its main function, but also to function as a magnetic core. Consequently, the hollow circular cylinder 100 must be formed of a magnetic material with a high material strength, and is usually made of a metal bulk body, for example, a bulk body of an iron magnetic material. Since the configuration of the rotary section is restricted by the structure of the joint member at the driving side, which is set in a drive train between a measurement roller and a load object such as a dynamometer or a brake system in a chassis dynamo rotated by a wheel of a vehicle, and to which the rotary section is attached by a screw engaging into the screw hole 103 of the driving side flange 101, the metal bulk body, which constitutes the hollow circular cylinder 100 functioning as a magnetic core, fails to form a closed magnetic path, thus the degree of magnetic coupling between the primary coil 116 and the secondary coil 117 is low resulting in generation of leakage flux, and also since the metal bulk body suffers loss due to eddy current in use at high-frequency electromagnetic induction, the transmission efficiency is poor.

As far as a solution to the poor transmission efficiency is concerned, the hollow circular cylinder 100 is preferably formed of ferrite which suffers a reduced high-frequency loss. Ferrite, however, has a low impact resistance and therefore invites a serious problem with reliability in strength, for example, fracture due to the second coil 117 expanding during the rotation of the rotary section, which makes it difficult to use ferrite for the hollow circular cylinder 100. Accordingly, the transmission efficiency is normally improved by modifying the configuration of the rotary section functioning as a magnetic core, and by adjusting the number of turns on the coils, but the restrictions by applications and usage environments make it difficult to modify the material and configuration of the hollow circular cylinder 100.

In consideration of the loss due to the eddy current and the low degree of magnetic coupling, the number of turns on the secondary coil 117 is increased, and/or an increased power is supplied to the primary coil 116 in order to have a specified power yielded at the secondary side. However, increasing the number of turns on the secondary coil 117 leads to an increased weight of the rotary section and also makes the winding of the secondary coil 117 easily get out of shape at a high-speed rotation thereby causing damages to the secondary coil 117. On the other hand, increasing exciting current to the primary coil 116 requires usage of an increased diameter of a wire on the primary coil 116 and provision of an insulating structure, which causes a copper loss in the wire and also an increase in the production cost.

SUMMARY OF THE INVENTION

The present invention has been made in light of the above problems, and it is an object of the present invention to provide a torque measuring device for a rotating body, in which transmission efficiency is improved between a primary coil and a secondary coil of a rotary transformer to supply electric power from a stationary section to a rotary section.

In order to achieve the object described above, according to an aspect of the present invention, there is provided a torque measuring device for a rotating body, which includes: a stationary section; a rotary section; and a rotary transformer composed of a primary coil disposed at the stationary section, and a secondary coil disposed at the rotary section, wherein an electric power is transmitted from the stationary section to the rotary section by electromagnetic induction, a torque generated at a rotating body is detected at the rotary section by means of the electric power transmitted, and wherein a detection result is transmitted from the rotary section to the stationary section, and the torque measuring device for a rotating body further includes a capacitor connected at a side of the secondary coil of the rotary transformer, and a series resonant circuit is formed by the capacitor in combination with a leakage inductance of the rotary transformer. Consequently, a large output can be efficiently yielded at the secondary coil side thus improving transmission efficiency from the stationary section to the rotary section, which results in a reduced number of turns on the secondary coil and an enhanced reliability of the torque measuring device for a rotating body.

In the aspect of the present invention, the capacitor connected at the side of the secondary coil may be a variable capacitor. Consequently, the capacitor can be easily adjusted for a resonance point when the joint member at the driving side jointed to the outer side of the driving side flange is subjected to change, whereby the torque measuring device for a rotating body can be flexibly used.

DETAILED DESCRIPTION OF THE PREFERRED EMBODIMENT

Figure 1:
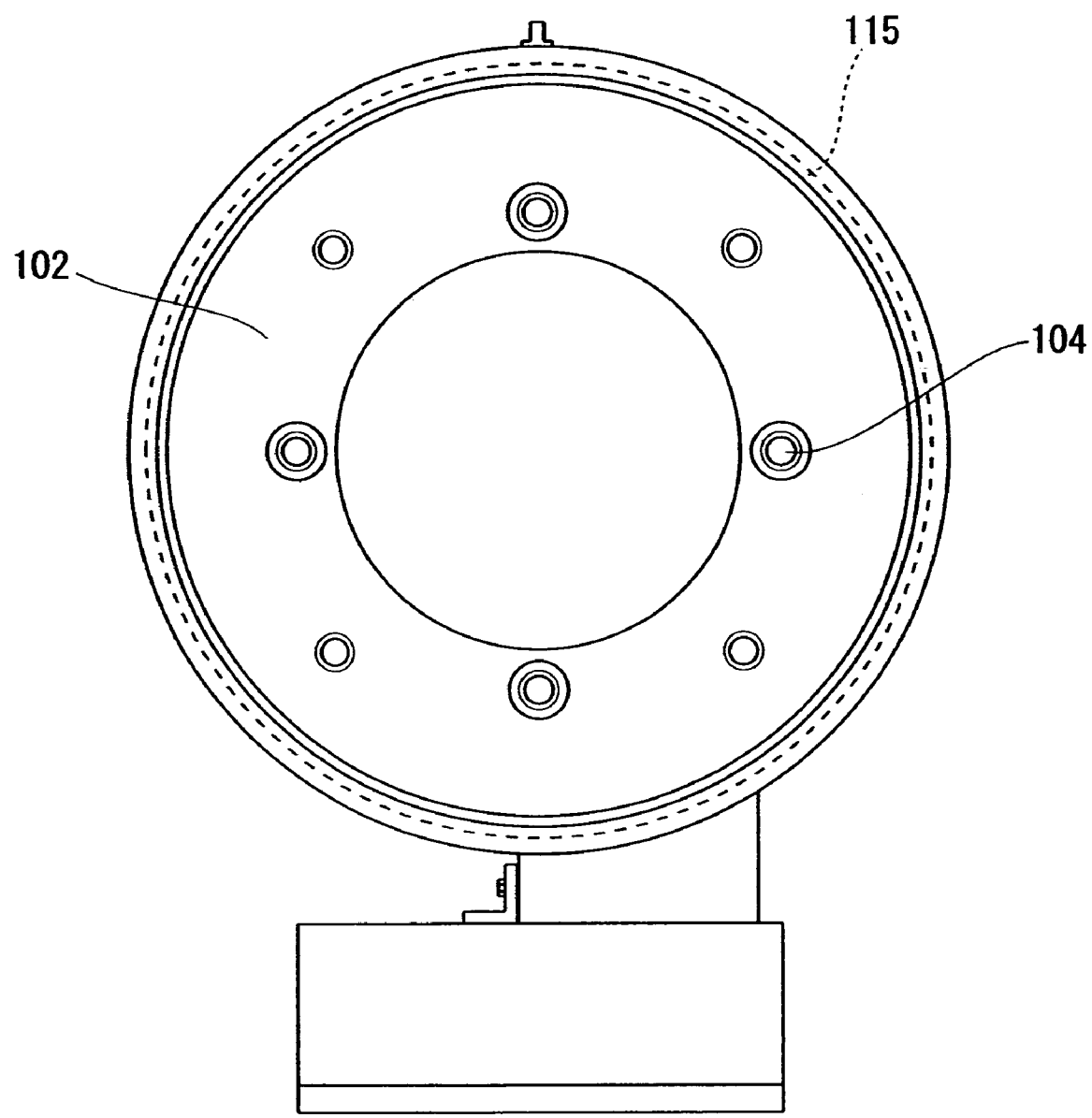
FIG. 1 is a front view of a conventional torque measuring device for a rotating body.
Figure 2:
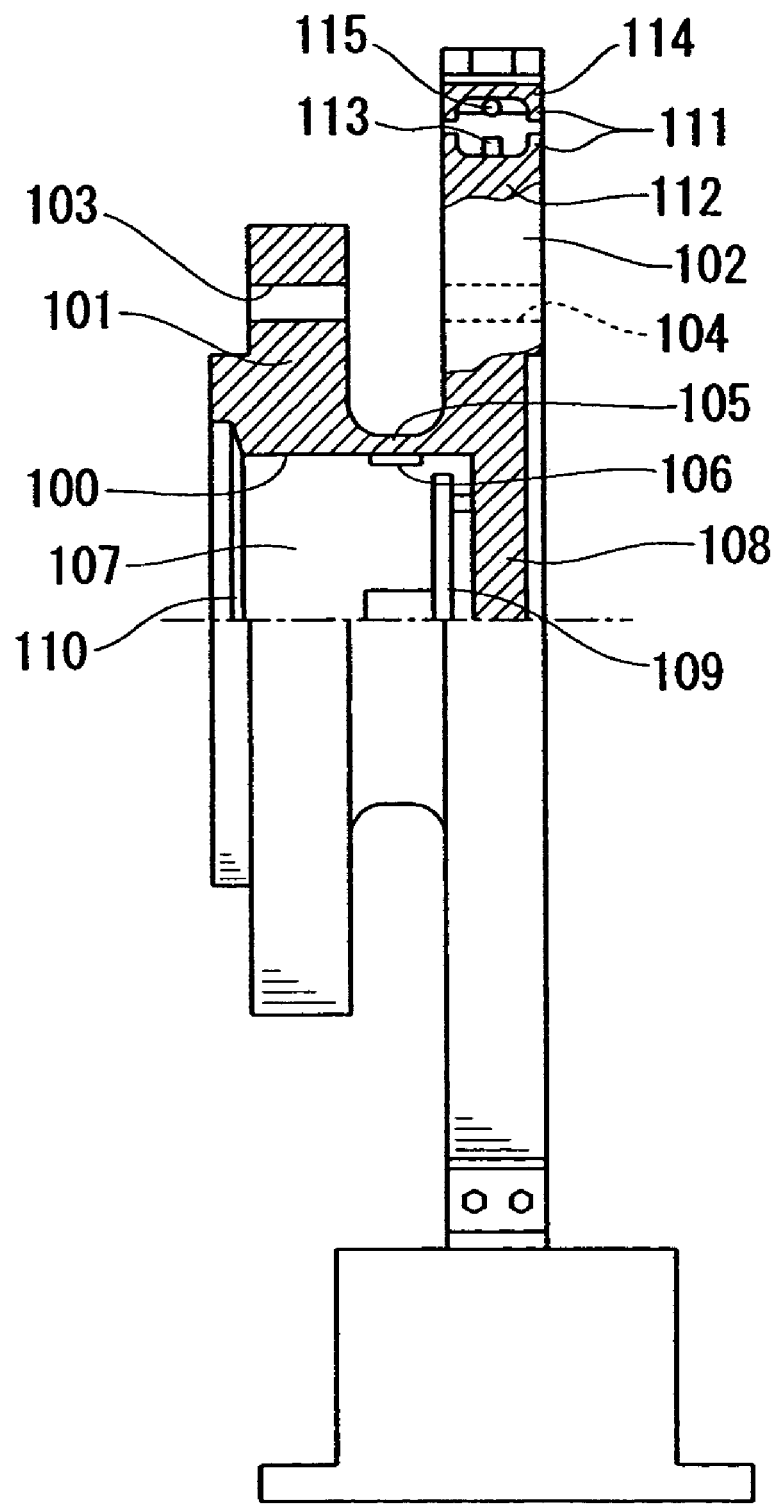
FIG. 2 is a side view (partly sectioned) of the conventional torque measuring device for a rotating body of FIG. 1.
Figure 3:
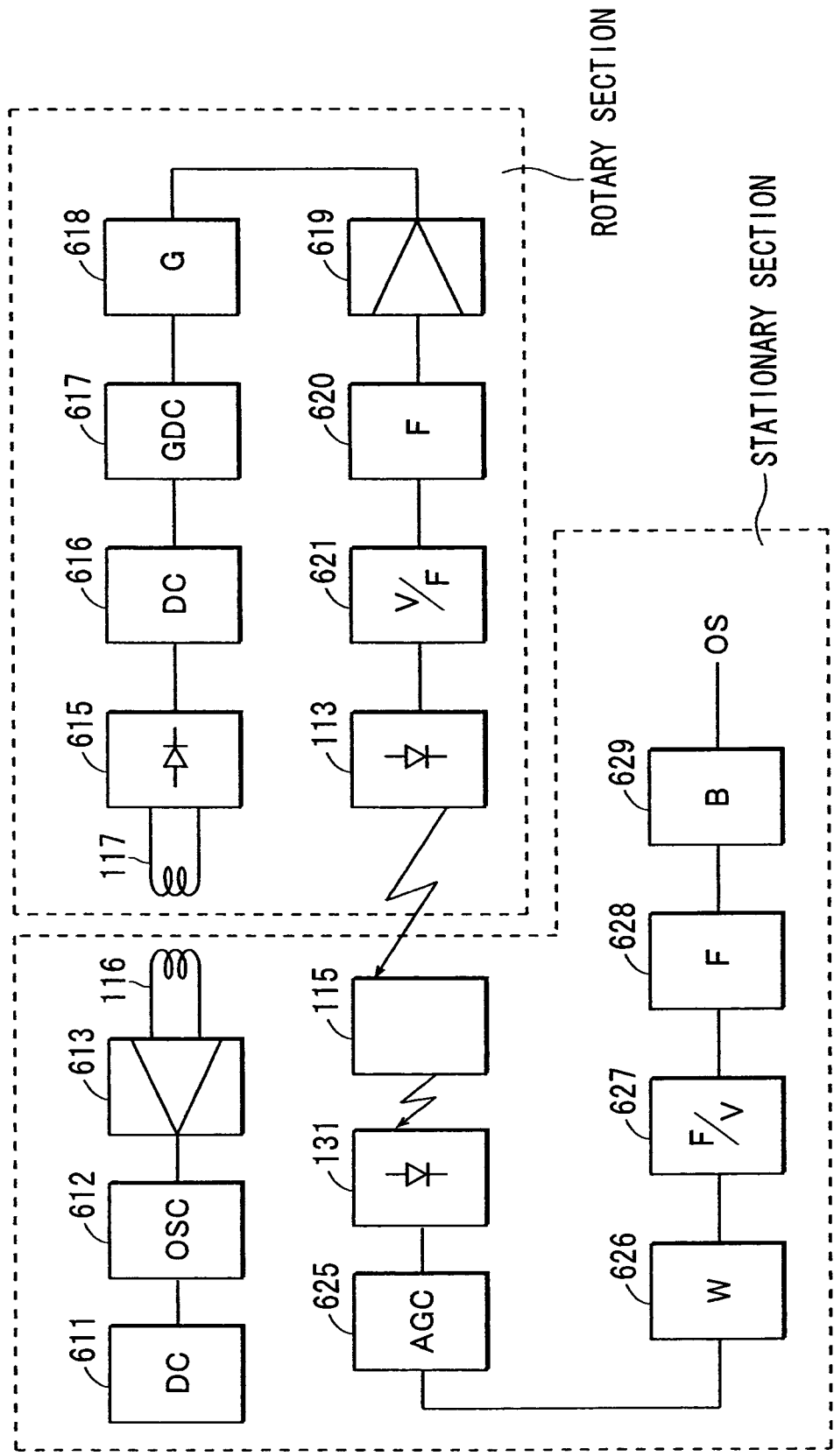
FIG. 3 is a block diagram of respective circuitries at a rotary section and a stationary section of the conventional torque measuring device for a rotating body of FIG. 1.
Figure 4:
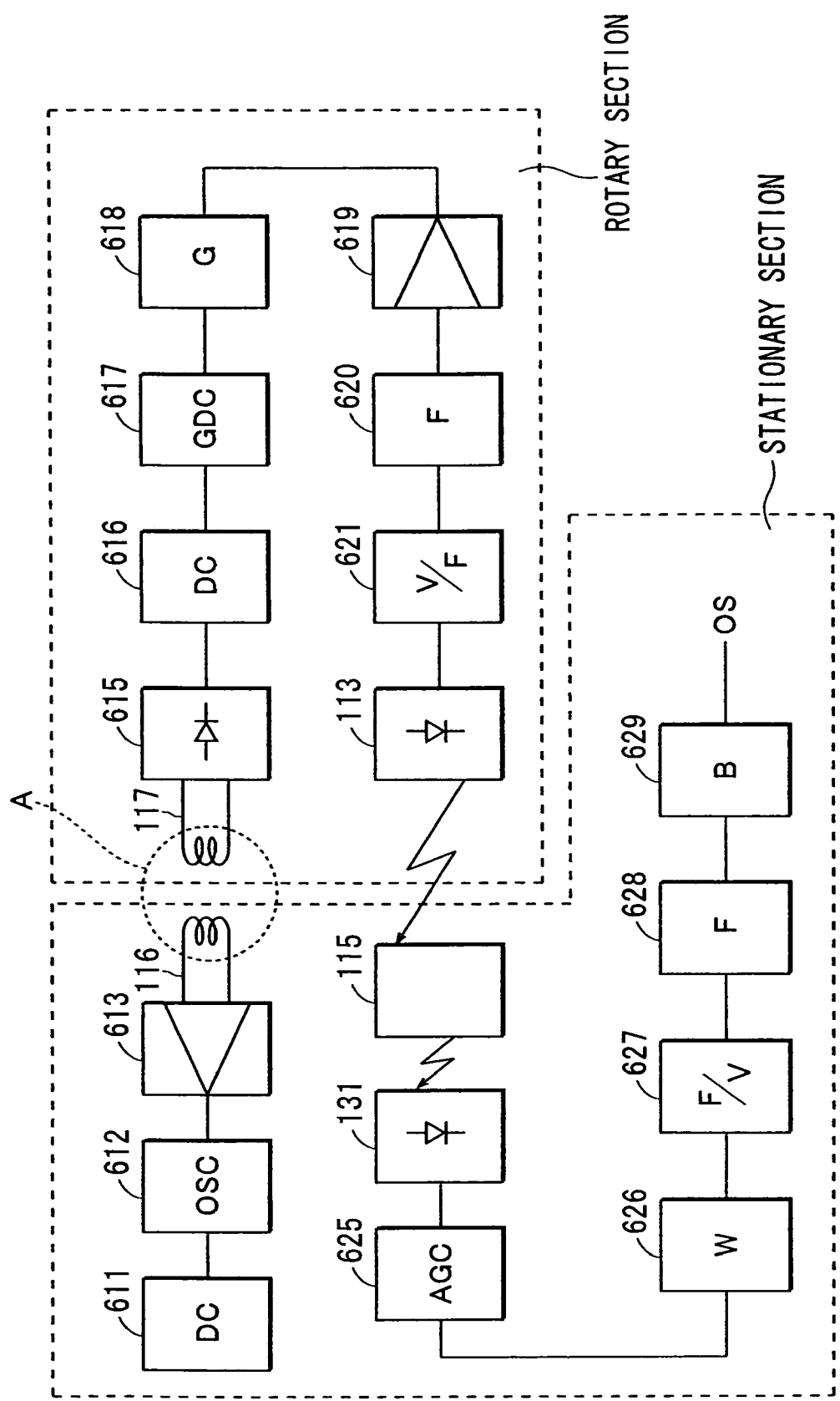
FIG. 4 is a block diagram of respective circuitries at a rotary section and a stationary section of a torque measuring device for a rotating body according to the present invention.

A preferred embodiment of the present invention will hereinafter be described with reference to FIGS. 4 to 6. The appearance and basic structure of a torque measuring device for a rotating body according to the present invention are the same as those of a conventional torque measuring device for a rotating body as shown in FIGS. 1 to 3, and the description will be made with reference to FIGS. 1 and 3 as well.

The torque measuring device for a rotating body according to the present embodiment includes a rotary section which is composed of a driving side flange 101 fixedly jointed to a rotating body, a driven side flange 102, and a hollow circular cylinder 100 blinded at one end, defining predetermined outer and inner diameters thus a predetermined wall thickness, and having the driving side and driven side flanges 101 and 102 integrally formed at both end portions thereof.

The driving side flange 101 has its outer side jointed to a joint member at a driving side in a drive train by a screw engaging into a screw hole 103, while the driven side flange 102 has its outer side jointed to a load object by a screw engaging into a screw hole 104.

A plurality of strain gauges 106 are adhesively attached to the inner circumference of the hollow circular cylinder 100 in a line along a portion 105 having the smallest radial thickness. A physical quantity corresponding to a torque acting on the hollow circular cylinder 100 is converted into an electrical signal by a sensor using the strain gauges 106.

The driven side flange 102 has, toward its outer circumference, a rotary transformer 111 which is formed by a primary coil 116, and a secondary coil 117 disposed so as to oppose the primary coil 116. A magnetic core 112 at the rotary section is for the secondary coil 117 of the rotary transformer 111 and has a groove in which light emitting diodes (LED'S) 113 as electrical-optical converting elements are provided, and a magnetic core 114 at the stationary section is for the primary coil 116 of the rotary transformer 111.

The electrical signal generated by the aforementioned sensor using the strain gauges 106 is converted into an optical signal by the LED's 113, and the optical signal outputted from the LED's 113 is received at the circumferential surface of an optical fiber 115 disposed at the stationary section thus signal transmission from the rotary section to the stationary section is performed.

The optical signal received at the circumferential surface of the optical fiber 115 progresses therethrough, exits out from the end surface thereof, and is received and converted into an electrical signal by an optical-electrical converting element, and a torque amount is calculated based on the electrical signal.

In such a torque measuring device for a rotating body, a circuit board 109 for mounting an electronic circuit is provided inside the hollow circular cylinder 100 at a blind end 108 thereof in order to reduce negative effects of wind force and centrifugal force due to a high-speed rotation on the strain gauges 106, and a lid 110 is provided at an open end 107 of the hollow circular cylinder 100 in order to prevent the strain gauges 106 from deteriorating by moisture and dusts coming from outside.

A function of the torque measuring device for a rotating body according to the present embodiment will now be discussed.

A DC voltage from a DC power supply 611 is converted into an AC voltage of a frequency of about 15 kHz by an oscillation circuit 612, and the AC voltage is amplified by an amplification circuit 613 and applied to the primary coil 116 of the rotary transformer 111 at the rotary section.

Then, an AC voltage is induced at the secondary coil 117 of the rotary transformer 111 at the stationary section, and converted into a DC voltage by a rectifying and smoothing circuit 615, the DC voltage has its fluctuation reduced by a stabilized power supply circuit 616, and a necessary voltage is supplied from a strain gauge power supply circuit 617 to a Wheatstone bridge circuit 618 formed by the strain gauges 106.

An output from the Wheatstone bridge circuit 618 is amplified by an amplifier 619, has its excess frequency components removed by a filter circuit 620, and is converted into a frequency-modulated signal by a voltage-frequency converter (V/F converter) 621.

The signal outputted from the voltage-frequency converter 621 is inputted to an electrical-optical converting element 113, and an optical signal outputted from the electrical-optical converting element 113 is received by the optical fiber 115 disposed at the stationary section and is converted into an electrical signal by a photodiode 131.

The electrical signal from the photodiode 131 is amplified by an AGC circuit 625, and the amplified signal goes via a waveform shaping circuit 626, has its frequency change converted into voltage change by a frequency-voltage converter (F/V converter), and has its noise components removed by a low-pass filter circuit 628.

A signal outputted from the low-pass filter circuit 628 is inputted to an output buffer circuit 629, and a torque measurement value is outputted from an output terminal OS.

The torque measuring device for a rotating body according to the present invention differs from the conventional torque measuring device for a rotating body in that a capacitor C is provided at the secondary coil 117, and a series resonant circuit is formed by the capacitor C and a leakage inductance.

Figure 5:
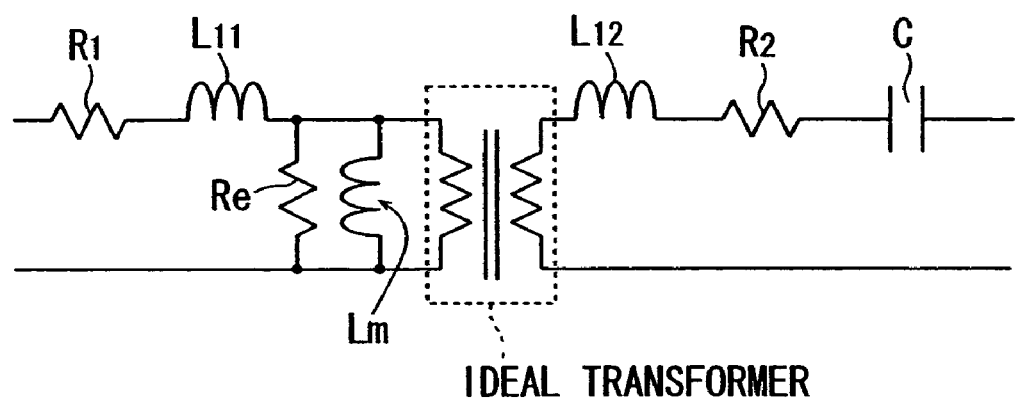
FIG. 5 is an equivalent circuit at a portion indicated by a dashed circular line A shown in FIG. 4.

Referring to FIG. 5 showing an equivalent circuit at the primary and secondary coils 116 and 117, where $R_1$ is a winding resistance of the primary coil 116, $R_2$ is a winding resistance of the secondary coil 117, $R_e$ is an eddy current equivalent resistance, $L_{11}$ is a leakage inductance at the primary side, $L_{12}$ is the aforementioned leakage inductance at the secondary side, $L_m$ is a mutual inductance, and C is the aforementioned capacitor connected at the secondary coil 117.

In the present embodiment, the leakage inductance $L_{12}$ is used as a resonant inductance, and forms, in combination with the capacitor C, a series resonant circuit as described above. Consequently, a large output is gained at the secondary coil 117, and the output gained is inputted to the rectifying and smoothing circuit 615, and is thereby bridge-rectified and smoothed. The capacitor C is a capacitor connected at the secondary coil 117 but may alternatively be constituted by a stray capacitance.

In case inductance varies due to the influence of the joint member at the driving side to be jointed to the outer side of the driving side flange 101, resonant frequency at the secondary coil 117 varies resulting in failure to gain an optimum output. Such a problem can be solved by appropriately setting the capacitance of the capacitor C so as to cause resonation.

Figure 6:
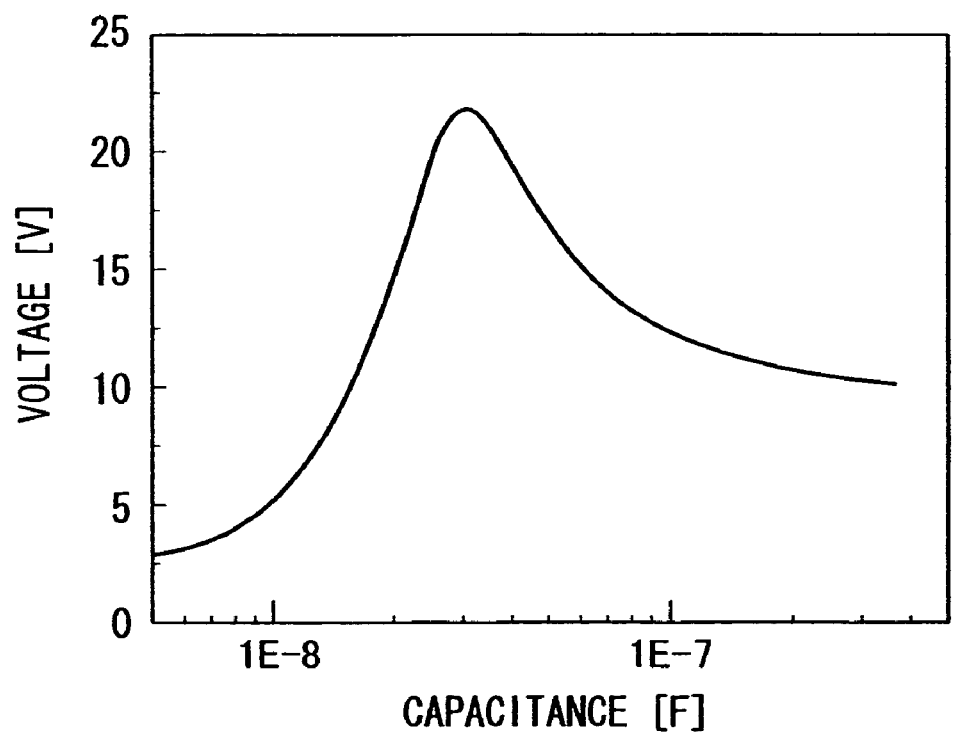
FIG. 6 is a graph showing a relation between a capacitance of a capacitor and an output of a secondary coil in the equivalent circuit of FIG. 5.

Referring to FIG. 6, where the abscissa axis indicates a capacitance of the capacitor C and the ordinate axis indicates an output, i.e., voltage at the secondary side, the output at the secondary side varies in accordance with the variation of the capacitance of the capacitor C and exhibits its peak value at a given capacitance value. The peak output is gained when the leakage inductance and the capacitor C connected at the secondary side series-resonate with each other. The capacitor C, if constituted by a variable-capacitance capacitor, can be easily adjusted for a resonance point when the joint member at the driving side jointed to the outer side of the driving side flange 101 is subjected to change, whereby the torque measuring device for a rotating body can be flexibly used. A trimmer capacitor, for example, may be preferably used as such a variable capacitor.

The present invention is not limited to a torque measuring device for a rotating body structured as shown in FIG. 1 but may be applied to any torque measuring device for a rotating body structured such that an electric power is supplied from the primary side to the secondary side in a non-contact manner.

What is claimed is:

1. A torque measuring device for a rotating body, the device comprising:
    (a) a rotary section having a driving side flange, a driven side flange and a hollow cylindrical portion interposed between the driving side flange and the driven side flange, the rotary section being integrally formed as one piece, and being made of an iron magnetic material;
    (b) a stationary section positioned for opposing an outer circumference of the driven side flange;

(c) a strain gauges attached to an inner circumferential surface of the hollow cylindrical portion;

(d) a rotary transformer including a primary coil disposed on an inner circumference of the stationary section, and a secondary coil disposed on an outer circumference of the driven side flange of the rotary section, wherein the primary coil and the secondary coil are arranged to face each other through a gap, wherein an electric power is transmitted from the stationary section to the rotary section by electromagnetic induction, a torque generated at a rotating body is detected at the rotary section by means of the electric power transmitted, and wherein a detection result is transmitted from the rotary section to the stationary section;

(e) a capacitor connected in series at a side of the secondary coil of the rotary transformer, whereby a combination of the capacitor and a leakage inductance of the rotary transformer causes a large output voltage at the secondary side of the rotary transformer; and, (f) a rectifying and smoothing circuit connected at the secondary coil of the rotary transformer, wherein the capacitor is connected between the secondary coil and the rectifying and smoothing circuit.

2. A torque measuring device for a rotating body according to claim 1, wherein the capacitor connected at the side of the secondary coil is a variable capacitor.

* * * * *